United States Patent [19]

Hall, Jr.

[11] Patent Number: 4,476,647
[45] Date of Patent: Oct. 16, 1984

[54] JAPANESE BEETLE TRAP

[76] Inventor: Howard R. Hall, Jr., 1065 W. Bristol Rd., Warminster, Pa. 18974

[21] Appl. No.: 407,178

[22] Filed: Aug. 11, 1982

[51] Int. Cl.³ .............................................. A01M 1/10
[52] U.S. Cl. ................................................ 43/122
[58] Field of Search ................. 43/107, 122, 132.1, 43/113

[56] References Cited

U.S. PATENT DOCUMENTS

| | | | |
|---|---|---|---|
| 1,787,421 | 12/1930 | Ruddell | 43/107 |
| 1,968,954 | 8/1934 | Metzger | 43/107 |
| 2,345,408 | 3/1944 | Martin | 43/107 |
| 2,715,295 | 8/1955 | Brown | 43/107 |
| 3,321,862 | 5/1967 | Peek | 43/113 |
| 3,465,468 | 9/1969 | Takamoto | 43/113 |
| 3,581,429 | 6/1971 | Hickman | 43/107 |
| 4,218,842 | 8/1980 | Anderson | 43/122 |
| 4,244,135 | 1/1981 | Harwoods | 43/122 |
| 4,360,987 | 11/1982 | Lowder | 43/122 |

*Primary Examiner*—Gene P. Crosby
*Attorney, Agent, or Firm*—Z. T. Wobensmith, III

[57] ABSTRACT

This disclosure relates to Japanese beetle traps, preferably made from a throw away type two liter plastic bottle, with inwardly curved baffles providing an inner flange with holes to permit a scent to escape to lure the beetles and with additional flanges to prevent flight out of the trap. A plastic bag may be secured to the lower end of the trap or if desired a quart jar may be mounted at the lower end of the trap.

9 Claims, 5 Drawing Figures

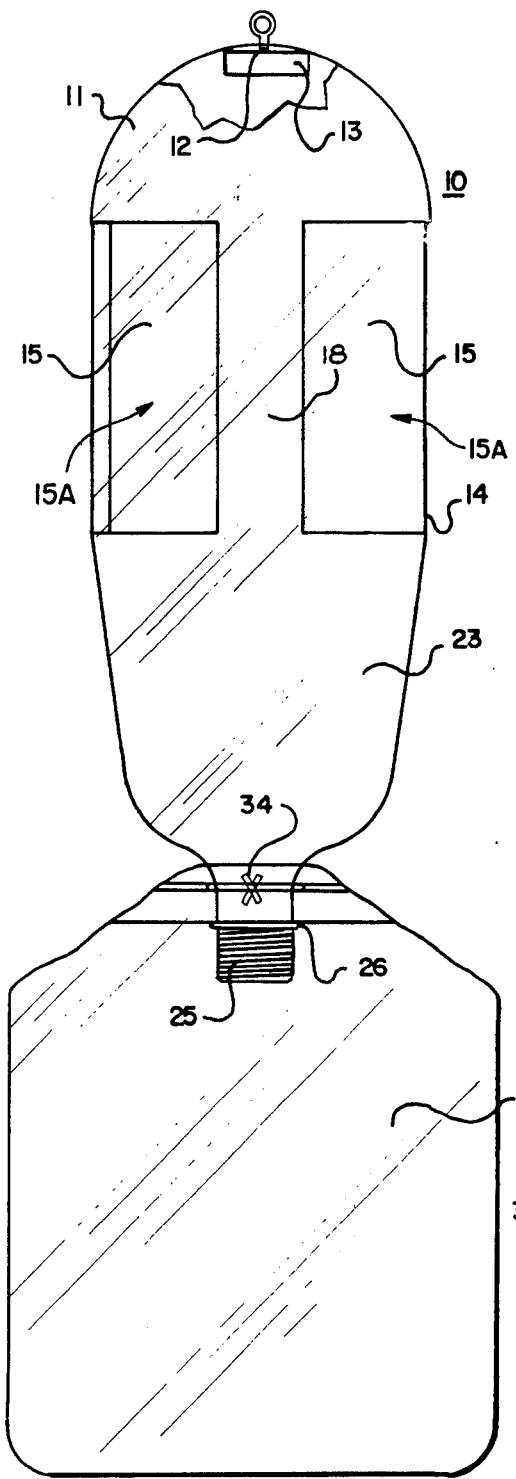
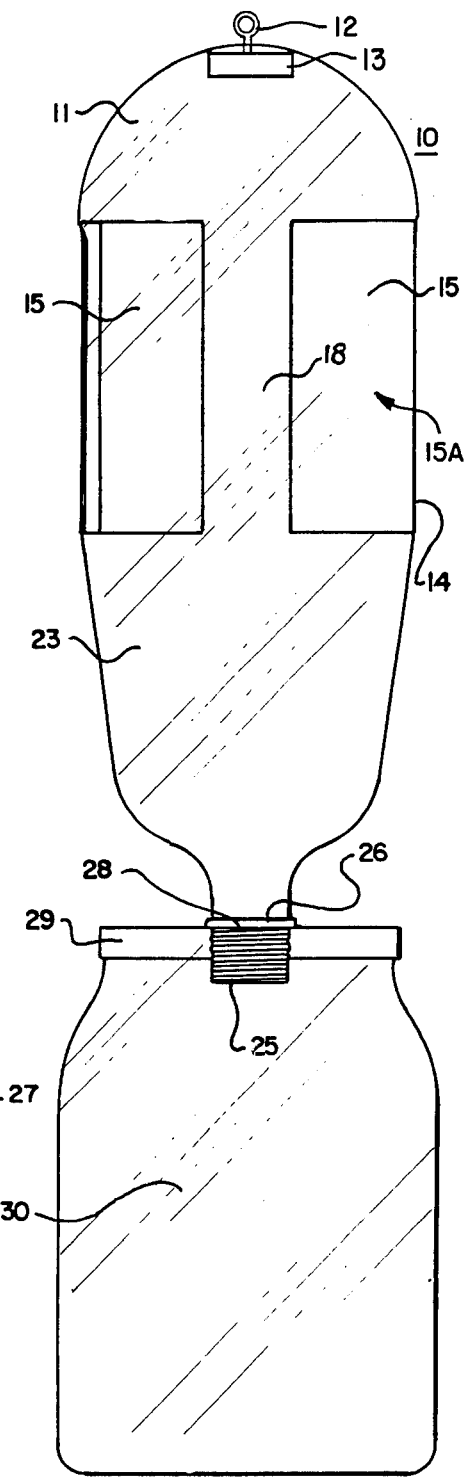

JAPANESE BEETLE TRAP

BACKGROUND OF THE INVENTION

1. Field of the Invention

This invention relates to a Japanese beetle trap.

2. Description of the Prior Art

Many structures have heretofore been proposed for catching and retaining Japanese beetles.

Metzger, in U.S. Pat. No. 1,968,954 shows a trap having an upper cylindrical shaped section having a funnel 4 therebelow with a jar 1 carried on the lower end of the funnel 4. Metzger has baffles 14 curved inwardly toward the centrally located bait container.

Ruddell, U.S. Pat. No. 1,787,421 and Martin, U.S. Pat. No. 2,345,408 show other beetle traps.

SUMMARY OF THE INVENTION

In accordance with the invention a beetle trap is provided, preferably made from a throw away type of a two liter plastic bottle having inwardly curved baffles providing an interior strut with holes to permit the scent to escape to lure the beetles and with additional baffles to prevent flight out of the trap.

It is the principal object of the invention to provide an improved trap for Japanese beetles.

It is a further object of the invention to utilize a throw away type two liter plastic bottle to make the trap.

It is a further object of the invention to form portions of the trap cut from walls thereof to provide a baffle and a partial support for the bait.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which:

FIG. 4 is a front elevational view of a trap having a plastic bag for collecting the beetles; and FIG. 5 is a front elevational view of a trap having a jar for collecting the beetles.

Figure 1:
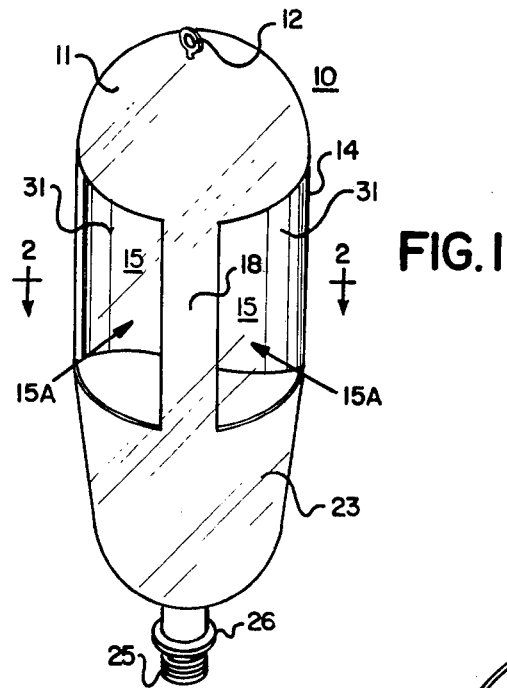
FIG. 1 is a side elevational view of one form of a Japanese beetle trap in accordance with the invention.
Figure 2:
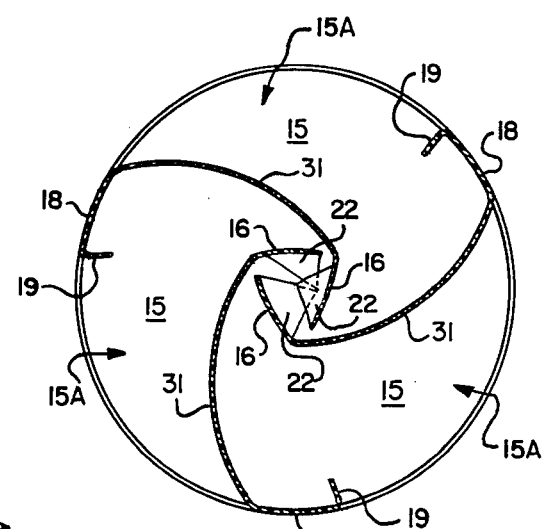
FIG. 2 is a transverse vertical sectional view taken approximately on the line 2—2 of FIG. 1.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENTS

Referring now to the drawings in which preferred embodiments of the invention are illustrated, a two liter disposable plastic bottle is preferably employed. The plastic base (not shown) applied to the bottom of the bottle 10 is removed by the application of heat and is discarded. The plastic bottles 10 are of three types, one of which has a hemispherical bottom 11 another of which has a moderately flattened dome, and a third of which has six lugs molded into the body portion so that it stands upright. All three types can be used to produce the beetle trap.

The bottom portion 11 of one of the types of bottles 10 has a dome shape which prevents rain from entering the trap and protects the bait lure which is held in the center of the trap. A hanger 12 is engaged in a wooden disc 13 which is held in place by a spot of adhesive (not shown).

Figure 3:
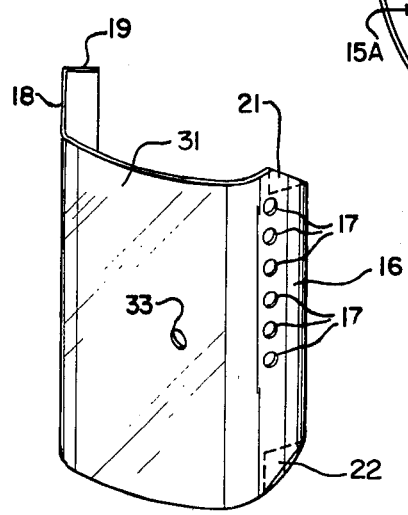
FIG. 3 is a view in perspective of one of the portions of the trap that has been cut from the wall to provide a baffle and a partial support for the bait.

At each side of the cylindrical portion 14 of the bottle 10 portions 15 as shown in FIGS. 1, 3 are provided by cutting into the cylindrical portion 14 of the bottle 10 to allow for access of the beetles, through openings 15A. The portions 15 preferably being of a height of about four inches and having an inner flange 16 with plurality of holes 17 for permitting the scent to escape to lure the beetles. The portions 15 are integral with the upper portion 11 and with the lower portion 23 of the trap and have panels or struts 18 with curved interior baffles 31 extending therefrom. The panels 18 each having a flange 19 extending therefrom which with panels 18 act to prevent the flight of beetles from the trap. Corners 21 and 22 are provided on the flange 16.

The lower part 23 of the bottle 10 provides a funnel shape for directing beetles downwardly. At the lower end 24 a threaded portion 25 is provided having a flange 26 thereabove.

A plastic bag 27, as shown in FIG. 4, may be attached by a tie 34 above the flange 26 for receiving the beetles.

In FIG. 5, the threaded portion 25 has secured thereto in threaded engagement therewith a fitting 28 with a screw cap 29 for supporting a jar 30.

The trap is baited with a strip (not shown) of floral scent and one of the baffles 31 has a hole 33 for plugging in a sex attractant pherenome to attract male beetles, available from Reuter Laboratories, Inc., P.O. Box 346, Haymarket, Va. 22069.

The corners 21 and 22 as illustrated are bent inwardly to retain the bait (not shown) in the center of the trap.

The mode of operation will be apparent from the foregoing. It will be noted that the floral scent within the flanges 16 will emit an odor available through the openings 17, while the pherenome, as a sex attractant, will also be available in the interior of the trap.

Beetles entering through the openings 15A are prevented from leaving by flanges 19, and fall through the funnel portion 23 and into either the plastic bag 27 or the jar 30.

I claim:

1. A Japanese beetle trap comprising
   a top portion,
   a cylindrical portion having openings for access of beetles to the interior and with struts therebetween,
   a lower part with a receptacle carried thereby for discharge of beetles into the receptacle,
   a plurality of vertically extending curved baffles mounted on said struts and having flanges with openings therethrough for passage of scent to lure the beetles, and
   said flanges enclosing a bait receiving space.

2. A Japanese beetle trap as defined in claim 1 in which
   said curved baffles have flanges for preventing beetles from leaving the trap.

3. A Japanese beetle trap as defined in claim 1 in which
   said trap is made from a plastic bottle.

4. A Japanese beetle trap as defined in claim 3 in which
   said plastic bottle is a two liter plastic bottle.
5. A Japanese beetle trap as defined in claim 1 in which
   said top portion is interiorly curved.
6. A Japanese beetle trap as defined in claim 5 in which
   said top portion is hemispherical.
7. A Japanese beetle trap as defined in claim 1 in which
   said lower part is funnel shaped.
8. A Japanese beetle trap as defined in claim 1 in which
   said receptacle is a plastic bag.
9. A Japanese beetle trap as efined in claim 1 in which said receptacle is a jar.

* * * * *